(12) United States Patent
Gagliardi

(10) Patent No.: US 12,029,221 B2
(45) Date of Patent: Jul. 9, 2024

(54) PREPARED CHICKEN OR OTHER ANIMAL PRODUCT

(71) Applicant: Zachary Stoltzfus, Leola, PA (US)

(72) Inventor: Eugene Gagliardi, Landenberg, PA (US)

(73) Assignee: Zachary Stoltzfus, Leola, PA (US)

( * ) Notice: Subject to any disclaimer, the term of this patent is extended or adjusted under 35 U.S.C. 154(b) by 0 days.

(21) Appl. No.: 17/984,033

(22) Filed: Nov. 9, 2022

(65) Prior Publication Data
US 2023/0143756 A1 May 11, 2023

Related U.S. Application Data

(60) Provisional application No. 63/277,514, filed on Nov. 9, 2021.

(51) Int. Cl.
*A22C 21/00* (2006.01)
*A22C 17/00* (2006.01)

(52) U.S. Cl.
CPC ........ *A22C 21/0023* (2013.01); *A22C 17/006* (2013.01)

(58) Field of Classification Search
USPC .................................................. 452/174, 160
See application file for complete search history.

(56) References Cited

U.S. PATENT DOCUMENTS

| 4,229,859 | A | 10/1980 | Gagliardi, Jr. et al. |
| 4,628,569 | A | 12/1986 | Gagliardi, Jr. |
| D292,640 | S | 11/1987 | Gagliardi, Jr. |
| D293,040 | S | 12/1987 | Gagliardi, Jr. |
| D293,041 | S | 12/1987 | Gagliardi, Jr. |
| 4,728,524 | A | 3/1988 | Gagliardi, Jr. |
| 5,069,914 | A | 12/1991 | Gagliardi, Jr. |
| 5,088,957 | A | 2/1992 | Gagliardi, Jr. |
| 5,195,924 | A | 3/1993 | Gagliardi, Jr. |
| 5,232,397 | A | 8/1993 | Gagliardi, Jr. |
| 5,250,309 | A | 10/1993 | Gagliardi, Jr. |
| 5,266,064 | A | 11/1993 | Gagliardi, Jr. |
| 5,273,483 | A | 12/1993 | Gagliardi, Jr. |
| 5,286,229 | A | 2/1994 | Gagliardi, Jr. |

(Continued)

*Primary Examiner* — Richard T Price, Jr.
(74) *Attorney, Agent, or Firm* — Panitch Schwarze Belisario & Nadel LLP

(57) ABSTRACT

A method for preparing a food product, from a half chicken breast having a longitudinal axis, an outwardly facing surface, and an opposite surface, includes making cuts along cut lines oriented transversely with respect to the longitudinal axis, dividing the half chicken breast into first, second, third, and fourth transverse sectional pieces, each having a respective outward axially oriented surface formed from the outer facing surface, a respective inward axially oriented surface, and respective first and second transversely oriented surfaces oriented transversely with respect to the longitudinal axis. Respective inward axially oriented surfaces of the first and fourth transverse sectional pieces are aligned in facing engagement to form a first chicken-breast steak, and the second and third transverse sectional pieces form a second chicken-breast steak. The outward axially oriented surfaces form an axially oriented perimeter surface of each chicken-breast steak. A strip of bacon may wrap each perimeter surface.

14 Claims, 12 Drawing Sheets

(56) References Cited

U.S. PATENT DOCUMENTS

| | | | |
|---|---|---|---|
| 5,297,984 A | 3/1994 | Gagliardi, Jr. | |
| 5,346,711 A | 9/1994 | Gagliardi | |
| 5,415,881 A | 5/1995 | Gagliardi | |
| 5,667,436 A | 9/1997 | Gagliardi, Jr. | |
| 5,765,768 A | 6/1998 | Gagliardi, Jr. | |
| 5,771,771 A | 6/1998 | Gagliardi, Jr. | |
| 5,779,532 A | 7/1998 | Gagliardi, Jr. | |
| 5,932,278 A * | 8/1999 | Gagliardi, Jr. | A23L 13/50 426/644 |
| 5,951,392 A | 9/1999 | Gagliardi | |
| 5,976,585 A | 11/1999 | Gagliardi, Jr. | |
| 5,976,608 A | 11/1999 | Gagliardi, Jr. | |
| 6,238,281 B1 | 5/2001 | Gagliardi, Jr. | |
| 6,248,013 B1 | 6/2001 | Thomas et al. | |
| 6,428,838 B1 | 8/2002 | Gagliardi, Jr. | |
| 6,939,217 B2 | 9/2005 | Gagliardi, Jr. | |
| 7,008,313 B2 | 3/2006 | Gagliardi, Jr. | |
| 7,029,388 B2 | 4/2006 | Gagliardi, Jr. | |
| 7,134,958 B2 | 11/2006 | Gagliardi, Jr. | |
| 7,479,296 B2 | 1/2009 | Gagliardi, Jr. | |
| 7,740,528 B1 | 6/2010 | Gagliardi, Jr. et al. | |
| 7,780,507 B2 | 8/2010 | Gagliardi, Jr. | |
| 7,867,069 B2 | 1/2011 | Gagliardi | |
| 9,192,186 B1 | 11/2015 | Gagliardi, Jr. et al. | |
| 2001/0030139 A1 | 10/2001 | Gagliardi, Jr. | |
| 2004/0239131 A1* | 12/2004 | Volk | A47J 43/18 294/61 |
| 2005/0123664 A1 | 6/2005 | Gagliardi, Jr. | |
| 2005/0124276 A1 | 6/2005 | Gagliardi, Jr. | |
| 2005/0271792 A1 | 12/2005 | Gagliardi, Jr. | |
| 2007/0042095 A1 | 2/2007 | Gagliardi, Jr. | |
| 2016/0192665 A1* | 7/2016 | Gagliardi | A22C 21/0076 452/135 |
| 2017/0181447 A1* | 6/2017 | Kreamer | H04N 13/279 |
| 2020/0297011 A1 | 9/2020 | Gagliardi et al. | |

* cited by examiner

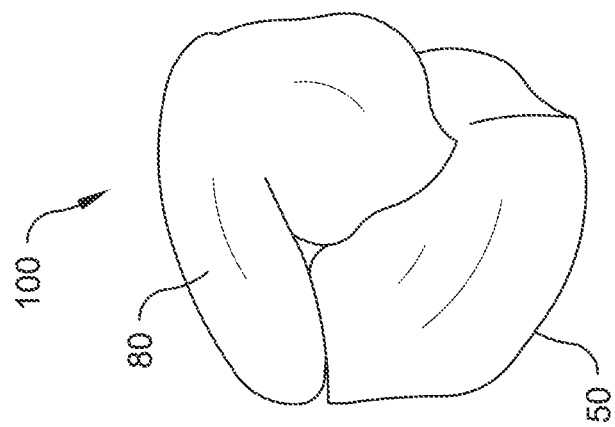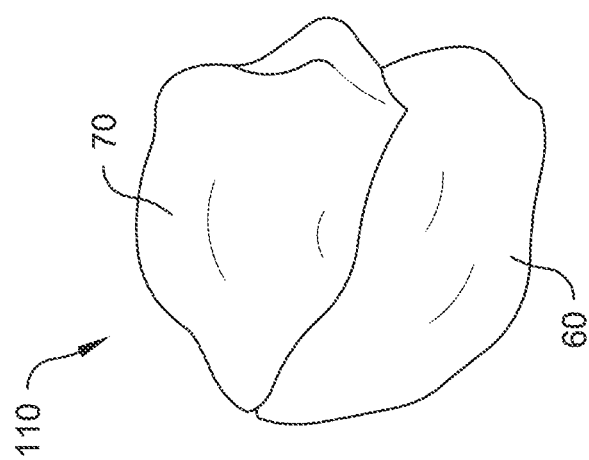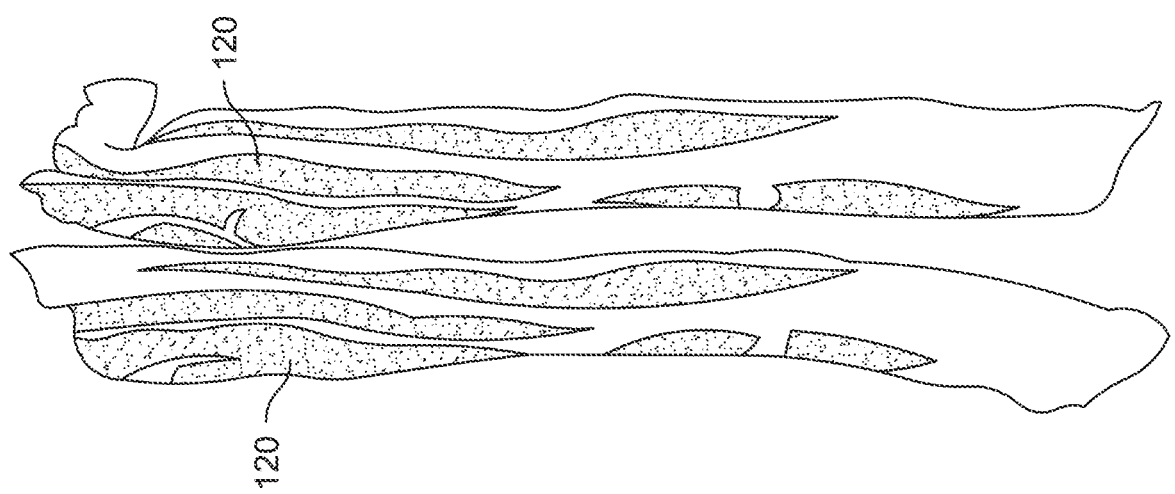
Fig. 6

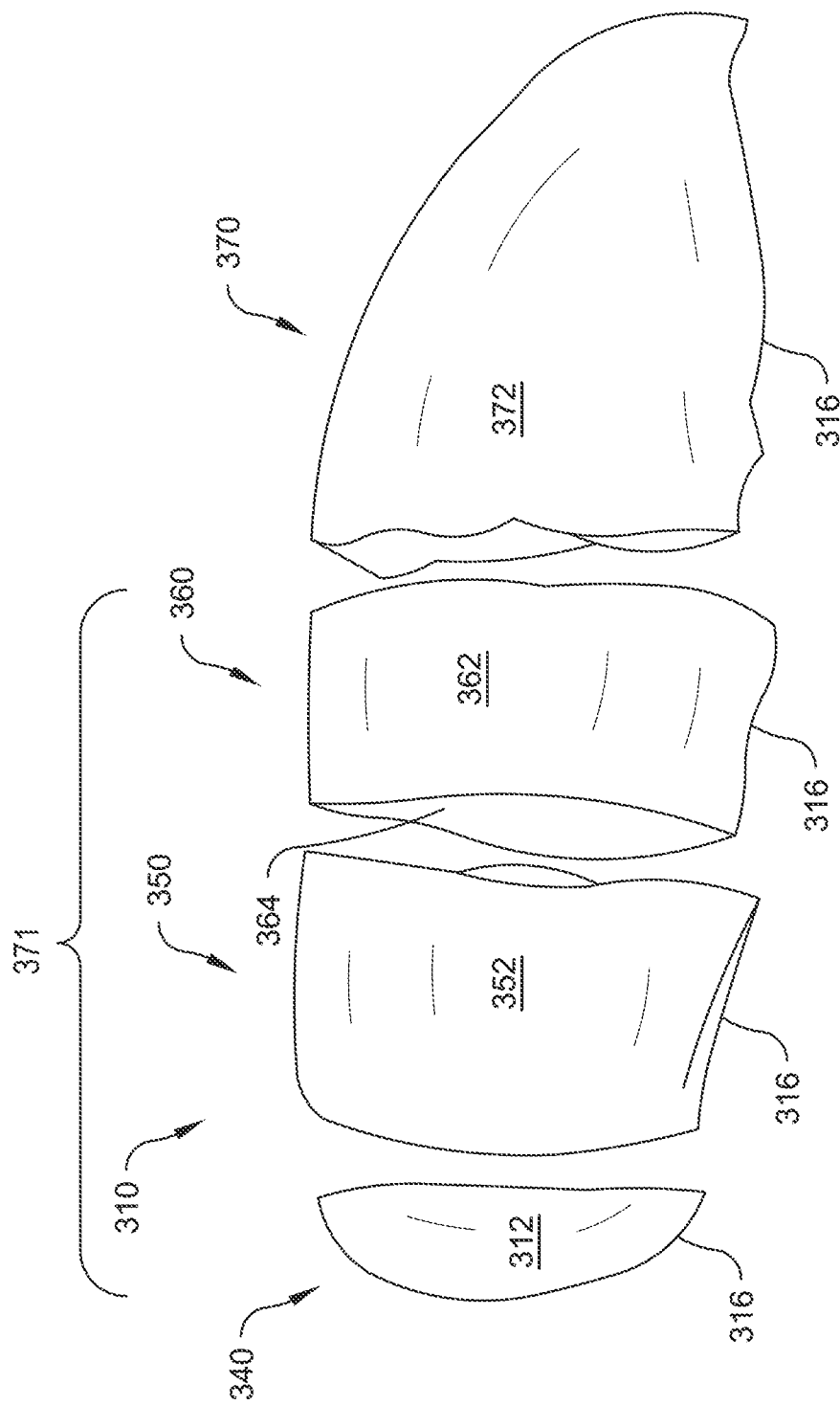

PREPARED CHICKEN OR OTHER ANIMAL PRODUCT

CROSS-REFERENCE TO RELATED APPLICATIONS

This application claims the benefit of priority under 35 USC § 119(e) of U.S. Provisional Patent Application No. 63/277,514 filed Nov. 9, 2021, the contents of which are incorporated herein by reference.

BACKGROUND OF THE DISCLOSURE

The present disclosure relates generally to food products that may be prepared from chicken, poultry, fowl, or other animal flesh. In certain aspects, the present disclosure relates more particularly to a food product prepared from specified transverse sectional pieces cut from a half chicken breast, other poultry or fowl breast or half breast, or other suitably shaped animal flesh, with the specified transverse sectional pieces being, in certain embodiments, wrapped with strips of bacon. In certain embodiments, the prepared food product comprises a half chicken breast cut into a combination of transverse sectional pieces suitable for wrapping in bacon and further comprises an elongated end body cut into a plurality of strips that remain attached at an end thereof. In certain embodiments, the two transverse sectional pieces may be mutually oriented and/or attached to form a chicken-breast steak, and the chicken-breast steak may be externally wrapped with a strip of bacon.

SUMMARY OF THE DISCLOSURE

Briefly stated, an example of a method for preparing a food product from a half chicken breast is disclosed. The half chicken breast is boneless and skinless and has a longitudinal axis, a generally smooth outwardly facing surface, and an opposite surface located opposite the outwardly facing surface. The example of the method comprises the step of making a plurality of cuts along cut lines oriented transversely with respect to the longitudinal axis of the half chicken breast. The cut lines divide the half chicken breast into first, second, third, and fourth transverse sectional pieces. Each transverse sectional piece has a respective outward axially oriented surface formed from the outer facing surface, a respective inward axially oriented surface formed opposite the respective outward axially oriented surface, and respective first and second transversely oriented surfaces oriented transversely with respect to the longitudinal axis. The example of the method includes aligning the respective inward axially oriented surfaces of the first and fourth transverse sectional pieces in facing engagement to form a first chicken-breast steak wherein the outward axially oriented surfaces form an axially oriented perimeter surface. The example of the method includes aligning the respective inward axially oriented surfaces of the second and third transverse sectional pieces in facing engagement to form a second chicken-breast steak wherein the outward axially oriented surfaces form an axially oriented perimeter surface.

The method may further comprise the steps of wrapping a first strip of bacon around the axially oriented perimeter surface of the first chicken-breast steak; and wrapping a second strip of bacon around the axially oriented perimeter surface of the second chicken-breast steak. The first, second, third, and fourth transverse sectional pieces may be cut from sequentially adjacent portions of the half chicken breast. The method may further comprise the steps of pushing a first skewer through the first and fourth transverse sectional pieces to secure the first chicken-breast steak; and pushing a second skewer through the second and third transverse sectional pieces to secure the second chicken-breast steak. The method may further comprise the step of cooking the first chicken-breast steak following the wrapping thereof. The method may further comprise making an additional cut along an additional cut line oriented transversely with respect to the longitudinal axis of the half chicken breast, the additional cut line dividing a trim piece from the first transverse sectional piece. The method may further comprise making a second additional cut along a second additional cut line oriented transversely with respect to the longitudinal axis of the half chicken breast, the additional cut line dividing a second trim piece from the first transverse sectional piece.

An example of a method for preparing food products from a plurality of half chicken breasts is disclosed. Each half chicken breast may be boneless and skinless and may have a longitudinal axis, a generally smooth outwardly facing surface, and an opposite surface located opposite the outwardly facing surface. A example of the method comprises the step of processing each half chicken breast of the plurality of chicken breasts by making a plurality of cuts along cut lines oriented transversely with respect to the longitudinal axis of the half chicken breast. The cut lines divide the half chicken breast into at least first and second transverse sectional pieces, with each transverse sectional piece having a respective outward axially oriented surface formed from the outer facing surface, a respective inward axially oriented surface formed opposite the respective outward axially oriented surface, and respective first and second axially transverse oriented surfaces. The example of the method includes aligning respective inward axially oriented surfaces of first and second transverse sectional pieces in facing engagement to form a first chicken-breast wherein the outward axially oriented surfaces form an axially oriented perimeter surface.

The method may further comprise the step of wrapping a first strip of bacon around the axially oriented perimeter surface of the first chicken-breast steak. The method may further comprise the step of pushing a first skewer through the first and second transverse sectional pieces to secure the first chicken-breast steak. The method may further comprise the step of cooking the first chicken-breast steak following the wrapping thereof. The method may further comprise the step of making an additional cut along an additional cut line oriented transversely with respect to the longitudinal axis of the half chicken breast, the additional cut line dividing a trim piece from the first transverse sectional piece. The method may further comprise making a second additional cut along a second additional cut line oriented transversely with respect to the longitudinal axis of the half chicken breast, the additional cut line dividing a second trim piece from the first transverse sectional piece.

A further example of a method for preparing food products from a first half chicken breast is disclosed. The first half chicken breast is boneless and skinless and has a longitudinal axis, a generally smooth outwardly facing surface, and an opposite surface located opposite the outwardly facing surface. The example of the method comprises the step of making a cut along a cut line oriented transversely with respect to the longitudinal axis of the first half chicken breast to form an elongated end body having a first end and a second end and a steak portion. The example of the method comprises the step of making at least one butterfly cut in the elongated end body along a butterfly cut line extending parallel to the longitudinal axis, the butterfly cut line terminating partially through the elongated end body so that upper and lower portions of the elongated end body remain attached to one another at the first end. The example of the method comprises the step of making a plurality of vertical cuts in the elongated end body extending parallel to the longitudinal axis and along a plurality of vertical cut lines through the upper and lower portions of the elongated end body to carve a plurality of strips attached at attached ends thereof to the first end of the elongated end body.

The method may further comprise the step of making a second cut in the steak portion along a second cut line oriented transversely with respect to the longitudinal axis of the half chicken breast, the second cut line dividing the steak portion a first transverse sectional piece having an outward axially oriented surface formed from the outer facing surface, a respective inward axially oriented surface formed opposite the respective axially oriented surface, and first and second transversely oriented surfaces oriented transversely with respect to the longitudinal axis. The method may further comprise the step of processing a second half chicken breast, the second half chicken breast being boneless and skinless, having a longitudinal axis, and having a generally smooth outwardly facing surface and an opposite surface located opposite the outwardly facing surface. The processing includes making at least first and second cuts along first and second cut lines oriented transversely with respect to the longitudinal axis of the second half chicken breast. The first and second cut lines carve a second transverse sectional piece from the second half chicken breast. The second transverse sectional piece has an outward axially oriented surface formed from the outer facing surface, a respective inward axially oriented surface formed opposite the respective outward axially oriented surface, and first and second transversely oriented surfaces of the second transverse sectional piece, the first and second transversely oriented surfaces being oriented transversely with respect to the longitudinal axis. The method may further comprise the step of aligning the respective inward axially oriented surfaces of the first transverse sectional piece from the first half chicken breast and the second transverse sectional piece from the second half chicken breast in facing engagement to form a first chicken-breast steak wherein the outward axially oriented surfaces form an axially oriented perimeter surface. The method may further comprise the step of making a third cut along a third cut line oriented transversely with respect to the longitudinal axis of the half chicken breast, the third cut line carving a second transverse sectional piece having an outward axially oriented surface formed from the outer facing surface, a respective inward axially oriented surface formed opposite the respective outward axially oriented surface, and first and second transversely oriented surfaces of the second transverse sectional piece. The first and second transversely oriented surfaces are oriented transversely with respect to the longitudinal axis. The method may further comprise the step of aligning the respective inward axially oriented surfaces of the first and second transverse sectional pieces in facing engagement to form a first chicken-breast steak having an axially oriented perimeter surface. The method may further comprise the step of wrapping a first strip of bacon around the axially oriented perimeter surface of the first chicken-breast steak. The method may further comprise the step of wrapping a first strip of bacon around the axially oriented perimeter surface of the first chicken-breast steak.

BRIEF DESCRIPTION OF THE DRAWINGS

The foregoing summary, as well as the following detailed description of examples of systems and devices according to the invention, will be better understood when read in conjunction with the appended drawings. For the purpose of illustrating the invention, there are shown in the drawings embodiments presently preferred. It should be understood, however, that the invention is not limited to the precise arrangements and instrumentalities shown. In the drawings:

FIG. 6 is a plan view of first and second chicken-breast steaks of FIG. 5, with a strip of bacon for wrapping about each of the first and second chicken-breast steaks, according to the first embodiment of the present disclosure;

FIG. 9 is an upper front and top perspective view of the half chicken breast of FIG. 8 divided into a trim piece, two transverse sectional pieces, and an elongated end body following an initial series of cuts in processing the half chicken breast, according to the second embodiment of the present disclosure;

DETAILED DESCRIPTION OF THE INVENTION

Figure 1:
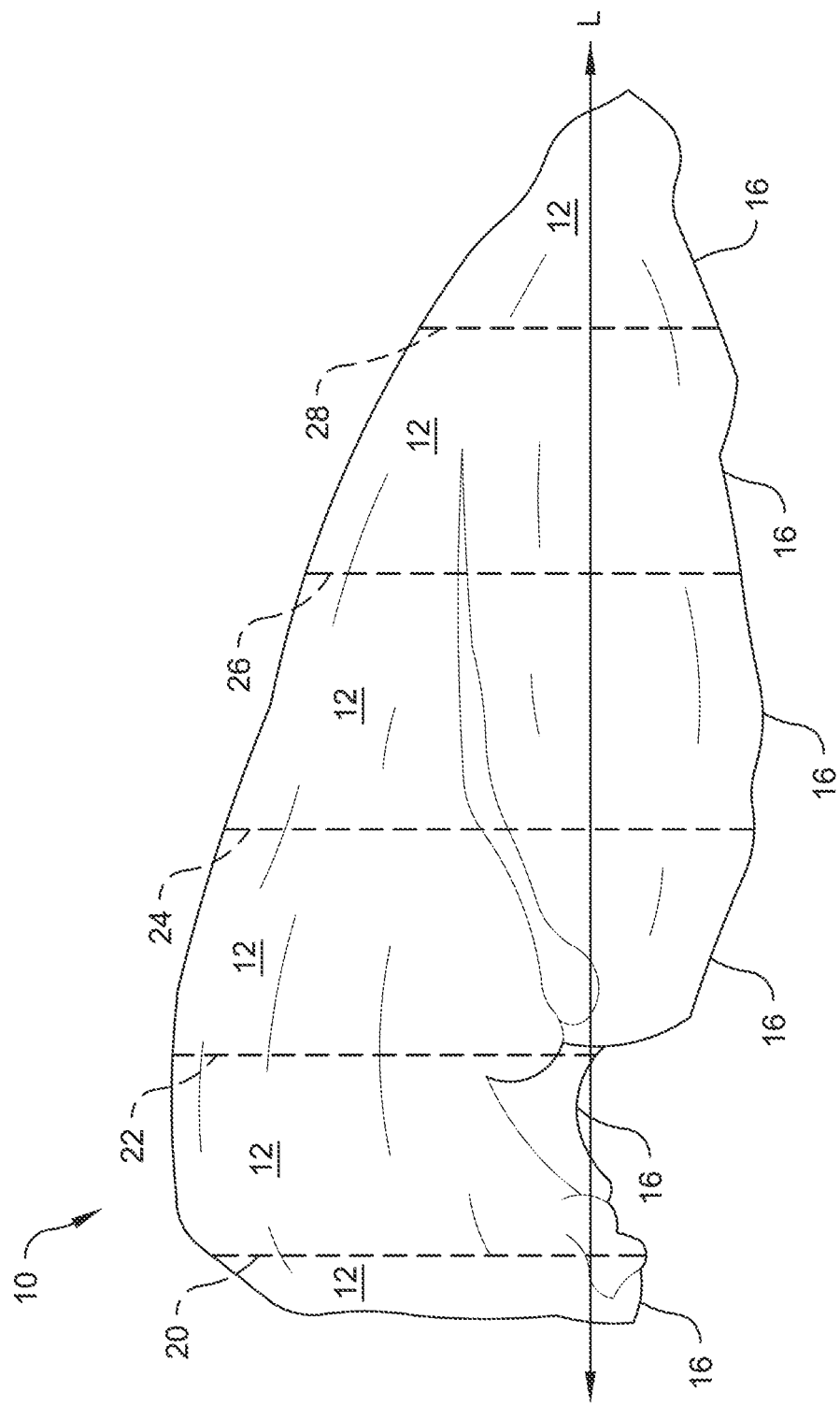
FIG. 1 is top plan view of a boneless, skinless half of a chicken breast, prior to processing into a first or a second embodiment, according to the present disclosure.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of a particular element or elements under discussion. Unless specifically set forth herein, the terms "a," "an," and "the" are not limited to one element but instead should be read as meaning "at least one." As used herein, the terms "proximal" and "distal" are relative terms referring to locations or elements that are closer to (proximal) or farther from (distal) with respect to other elements. The terminology includes the words noted above, derivatives thereof, and words of similar import. Moreover, the singular includes the plural, and vice versa, unless the context clearly indicates otherwise. The method steps recited in the appended claims need not be performed in any particular order.

A half chicken breast is half of a whole chicken breast, the whole chicken breast comprising both sides of the pectoral muscle of a chicken, with adjacent bones, skin, and cartilage, cut in the customary manner from the carcass of a chicken. In practice of the present invention, the half chicken breast is commonly and advantageously handled in a boneless, skinless state.

FIGS. 1 through 7 show an exemplary food item in the form of a half chicken breast, as processed in steps in and/or in the preparation of a first embodiment of the invention, which may take the form of either a food product or a method of preparing the same.

FIG. 1 is an upper front and top perspective view of a boneless, skinless half chicken breast 10, which is processed in and/or in the preparation of the first embodiment of the present disclosure. Although the half chicken breast 10 is not an even or defined geometric shape, the half chicken breast 10 has a longitudinal orientation, which is an essentially lengthwise orientation, and a longitudinal axis L. The half chicken breast 10 comprises animal tissue, preferably animal muscle tissue having a grain oriented generally parallel or roughly parallel to the longitudinal axis L in a substantial portion of the half chicken breast 10. A relatively smooth or smooth outwardly facing surface 12 (hereafter the "outward surface") of the half chicken breast 10 is oriented generally upwardly in FIGS. 1 through 3; the outwardly facing surface 12 also extends onto the sides or edges of the half chicken breast 10. The outwardly facing surface 12 refers to a surface of the half chicken breast 10 both before and after cutting. An opposite surface 14 of the chicken breast is oriented downwardly so that only the edge 16 thereof is visible in FIGS. 1 through 3. The opposite surface 14 is visible in FIGS. 4 through 7 and generally arises from the portion of the chicken breast that faces bones of a chicken carcass prior to removal of the bones. In FIG. 1, the dashed lines indicate a first cut line 20, a second cut line 22, a third cut line 24, and fourth cut line 26, and a fifth cut line 28, with each representing the location of a cut for preparing the half chicken breast 10 in accordance with the first embodiment. Each cut line 20, 22, 24, 26 and 28 is oriented generally oriented transversely with respect to the longitudinal axis L of the half chicken breast 10 and is oriented generally across the grain of the chicken breast 10. Preparation of a food product according to a first embodiment may include cutting the half chicken breast 10 by making a plurality of cuts along the cut lines 20, 22, 24, 26, 28.

Figure 2:
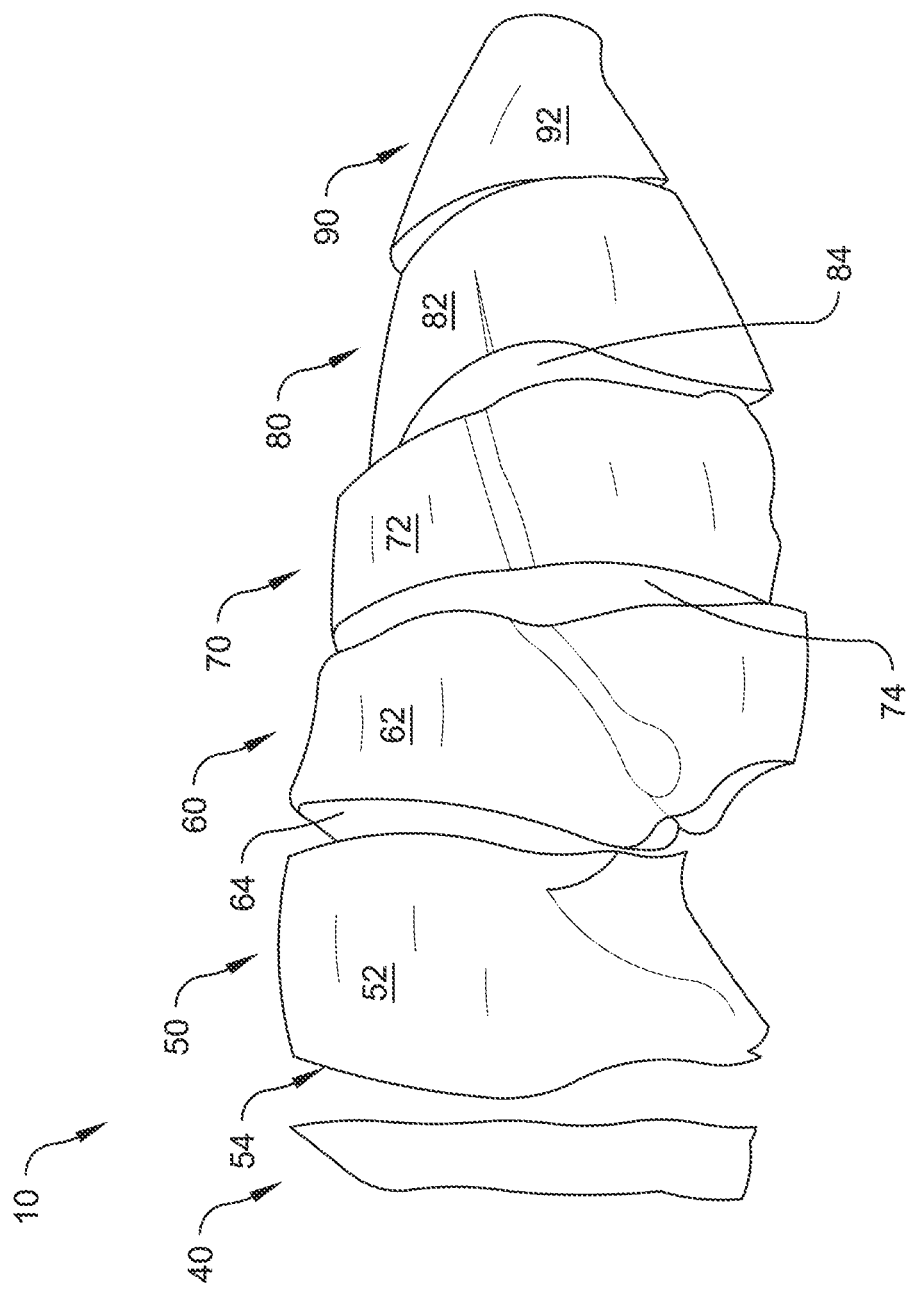
FIG. 2 is an upper front and top perspective view of the half chicken breast of FIG. 1 divided into four transverse sectional pieces following a series of cuts in processing the half chicken breast, according to the first embodiment of the present disclosure.
Figure 3:
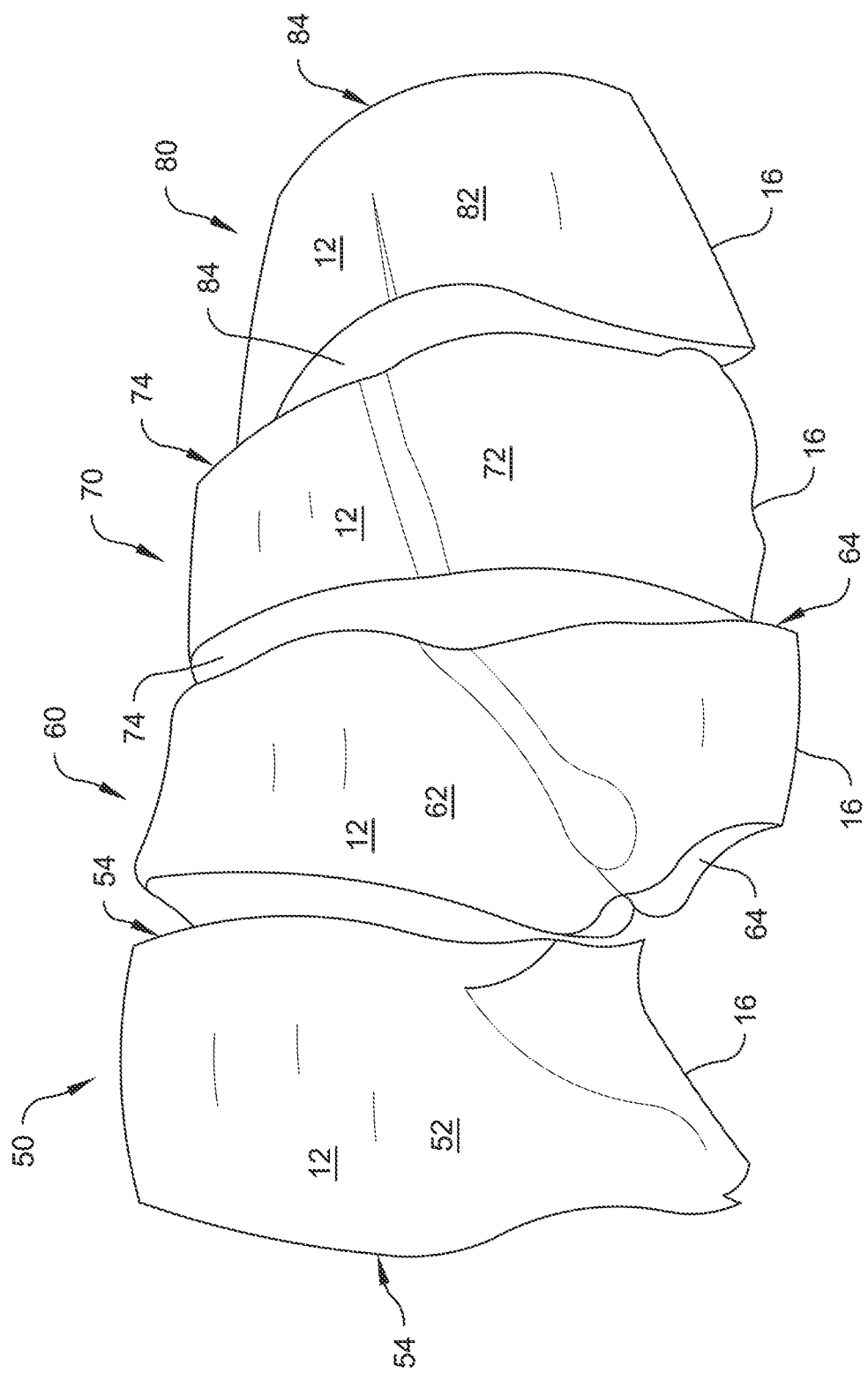
FIG. 3 is an upper front and top perspective view of the half chicken breast of FIG. 1, following removal of first and second trim pieces (not shown) from ends of the half chicken breast according to the first embodiment of the present disclosure.

FIG. 2 is an upper front and top perspective view of the half chicken breast 10 of FIG. 1, which has been divided into four transverse sectional pieces by making an initial series of cuts spaced about 1.5 inches to 2 inches apart (for a typical large half chicken breast) along the cut lines 20, 22, 24, 26, 28 of FIG. 1. The cuts result in the half chicken breast 10 being divided into a first trim piece 40, a first transverse sectional piece 50, a second transverse sectional piece 60, a third transverse sectional piece 70, a fourth transverse sectional piece 80, and a second trim piece 90, with cutting of the first and second trim pieces 40, 90 being optional. The first trim piece 40 and the second trim piece 90 may be used as desired; are not required for assembling the food product according to the present disclosure; and may be used in another product, such as a chicken patty (not shown). The four transverse sectional pieces 50, 60, 70, 80 respectively have first, second, third, and fourth axially oriented surfaces 52, 62, 72, 82; pairs of first transversely oriented surfaces 54, 64, 74, 84; and first inward axially oriented surfaces 56, 66, 76, 86, which collectively are formed from the opposite surface 14. FIG. 3 is an upper front perspective view of the half chicken breast of FIG. 1, following removal of first and second trim pieces 40, 90 from ends of the half chicken breast 10. The first transversely oriented surfaces 54, 64, 74, 84 are oriented transversely with respect to the longitudinal axis L.

Figure 4:
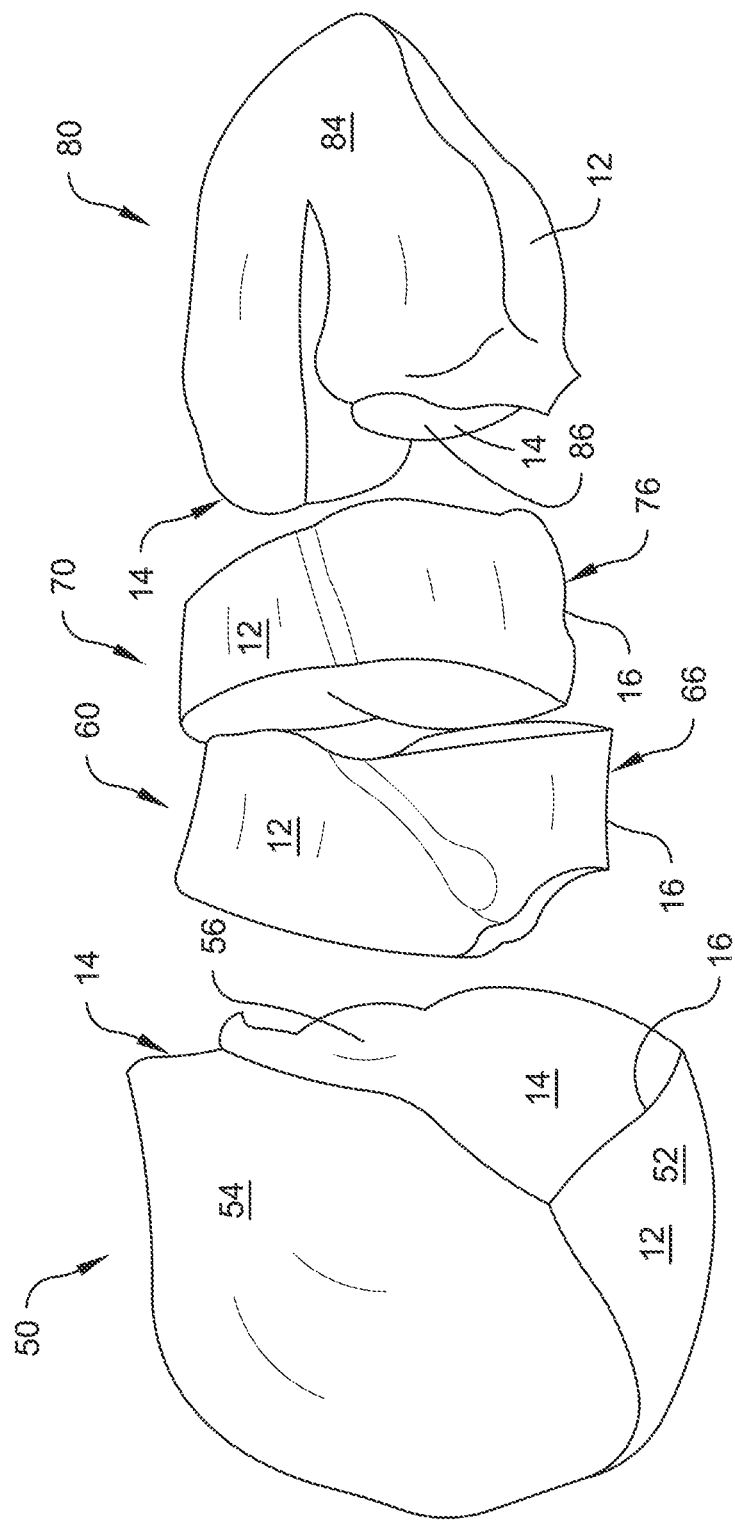
FIG. 4 is an upper front and top perspective view of the half chicken breast of FIG. 1, with first and fourth transverse sections oriented transversely as if laid flat, and with the second and third transverse sections oriented as if laid on a respective axially oriented surface of each of the second and third transverse sections in the same orientation as in FIG. 3, according to the first embodiment of the present disclosure.

FIG. 4 is an upper front and top perspective view of the half chicken breast of FIG. 1, with first and fourth transverse sectional pieces 50, 80 oriented as if laid flat, and the second and third transverse sections oriented as if laid on a respective first and second axially oriented surface 62, 72 of each of the second and third transverse sections in the same orientation as in FIG. 3, according to the first embodiment of the present disclosure.

Figure 5:
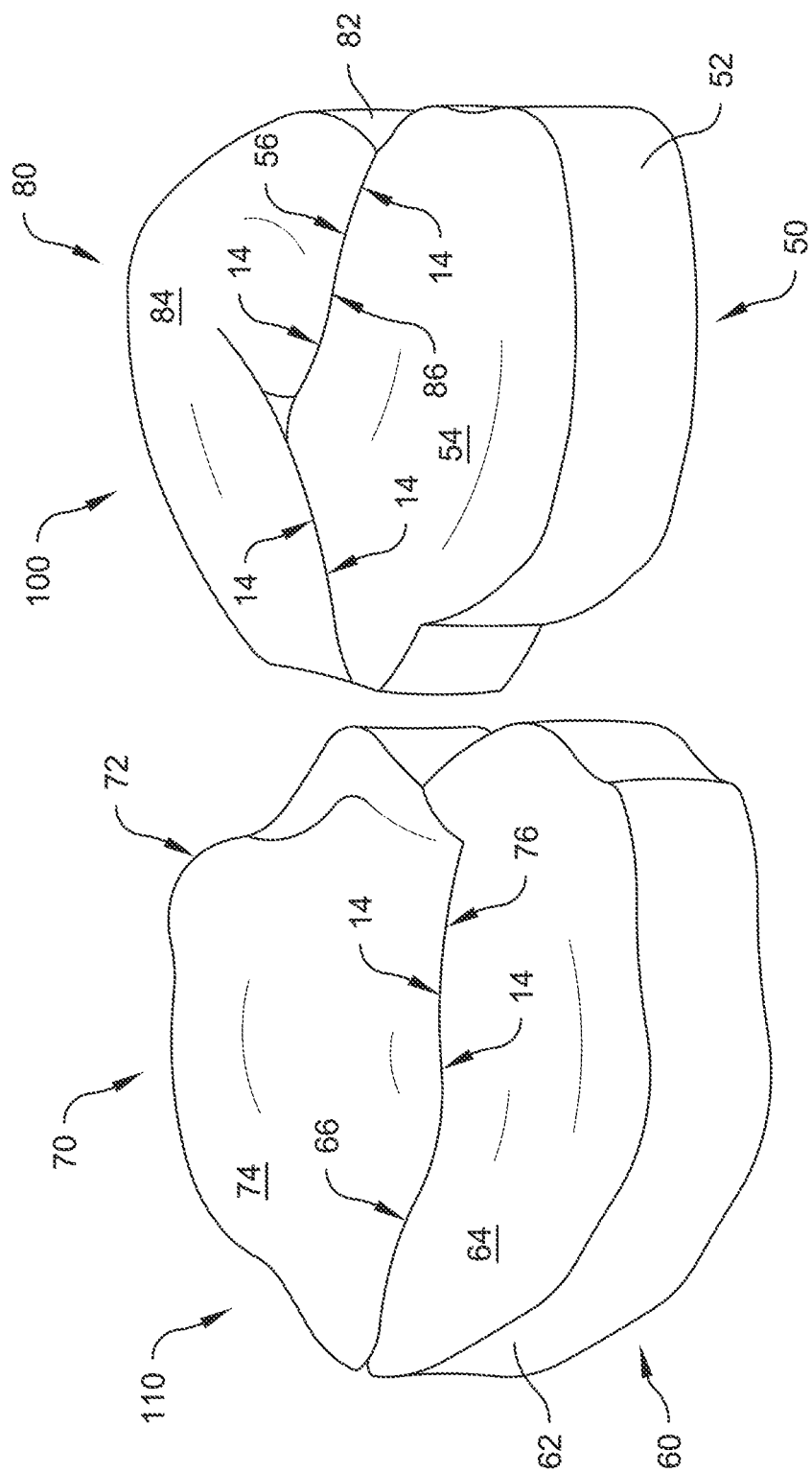
FIG. 5 is an upper front and top perspective view of the half chicken breast of FIG. 1, with the first and fourth transverse sectional pieces, and the second and third transverse sectional pieces, oriented as if laid on respective transversely oriented surfaces thereof and aligned to form first and second chicken-breast steaks, each suitable for wrapping with a strip of bacon to form a bacon-wrapped chicken-breast steak, according to the first embodiment of the present disclosure.

FIG. 5 is an upper front and top perspective view of the half chicken breast of FIG. 1, with the first and fourth transverse sectional pieces 50, 80, and the second and third transverse sectional pieces 60, 70, oriented as if laid on respective transversely oriented surfaces 64, 74 thereof. In the method of the first embodiment, the first and second chicken-breast steaks 100, 110 are formed by aligning the first and fourth transverse sectional pieces 50, 80, with the respective first inward axially oriented surface 56 in facing engagement with the fourth inwardly facing axially oriented surface 86, and the second and third transverse sectional pieces 60, 70 with the respective second inward axially oriented surface 66 in facing engagement with the third inward axially oriented surface 76. The first and second chicken-breast steaks 100, 120 are suitable for wrapping with a strip of bacon 120 (FIG. 6) to form a bacon-wrapped chicken-breast steak 130, 140 (FIG. 7), according to the first embodiment of the present disclosure; wrapping the first and second chicken-breast steaks 100, 120 with a strip of bacon 120 is optional (and often is preferred). By preparing the four transverse sectional pieces 50, 60, 70, 80 and assembling as shown, one may prepare two relatively evenly portioned first and second chicken-breast steaks 100, 110.

Figure 7:
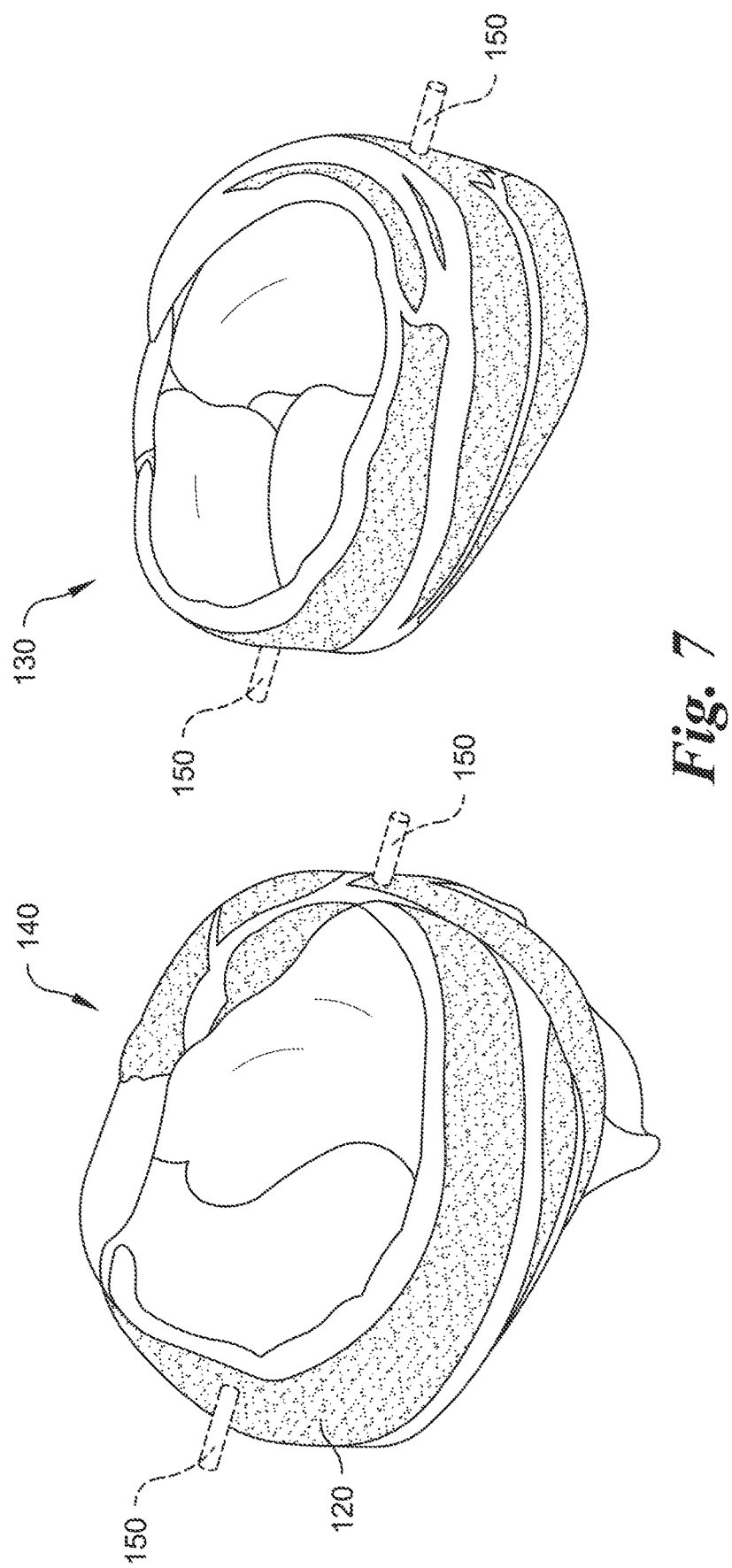
FIG. 7 is an upper front and top perspective view of the first and second completed bacon-wrapped chicken-breast steaks formed from the half chicken breast of FIG. 1, according to the first embodiment of the present disclosure.

FIG. 6 is a plan view of the first and second chicken-breast steaks 100, 110 of FIG. 5, with a strip of bacon 120 for wrapping about each of the first and second chicken-breast steaks 100, 110, according to the first embodiment of the present disclosure. In FIG. 7, the strips of bacon 120 are wrapped around the exterior of the first and second chicken-breast steaks 100, 110, forming a first bacon-wrapped chicken-breast steak 130 and a second bacon-wrapped chicken-breast steak 140. The components of the first bacon-wrapped chicken-breast steak 130 and the second bacon-wrapped chicken-breast steak 140 may optionally be secured by skewers 150, by pushing a skewer 150 through at least one of the bacon-wrapped chicken-breast steak 130, 140 (or through the transverse sectional pieces of a chicken-breast steak, whether wrapped in bacon or not) to secure the first or second chicken-breast steak 100, 110 in conventional fashion. Each skewer 150 is preferably constructed of a heat transfer material, such aluminum, to assist with cooking the internal area of the steak. As used herein, "skewer" refers to any pin or other comparable penetrating fastener used to attach pieces of food together. Each skewer may also be formed from other suitable metal, or from wood, nylon, or other suitable material as is known in the art. Metal material may be avoided if, for example, it is intended that the chicken-breast steak 100, 110 be cooked, defrosted, or reheated in a microwave oven. Each skewer 150 may have any suitable cross section; numerous such cross sections are known in the art, including circles, squares, and other shapes, including complex shapes. Each skewer 150 may be of any suitable length selected to engage selected elements (including any or all elements) of the chicken-breast steak 130, 140. The first and second bacon-wrapped chicken-breast steaks 140, 150 are then complete and ready for packaging, further processing, or cooking.

A method according to the present disclosure comprises preparing a bacon-wrapped chicken-breast steak according to the first embodiment of the present disclosure by following the steps described in the foregoing paragraphs. Alternatively, in any of the methods set forth herein, transverse sectional pieces from a plurality of half chicken breasts, the transverse sectional pieces being preferably selected to be relatively similar in size, may be assembled into one or more chicken-breast steaks by aligning inward axially oriented surfaces thereof. The method may further comprise the step of cooking the bacon-wrapped chicken steak by any suitable technique, such as broiling, grilling, sautéing, or frying.

In the embodiment of FIGS. 1-7, the first transverse sectional piece 50, second transverse sectional piece 60, third transverse sectional piece 70, and fourth transverse sectional piece 80 may be cut from sequentially adjacent portions of the half chicken breast 10. As a result, aligning the first and fourth transverse sectional pieces 50, 80 and the second and third transverse sectional pieces 60, 70 results in the first chicken-breast steak 100 and the second chicken-breast steak 110 being relatively well-matched or comparable in size given that both are cut from the half chicken breast 10 is the manner described above.

FIGS. 8 through 13 show an exemplary food item in the form of a half chicken breast, as processed in steps in and/or in the preparation of a second embodiment of the invention, which may take the form of either a food product or a method of preparing the same.

Figure 8:
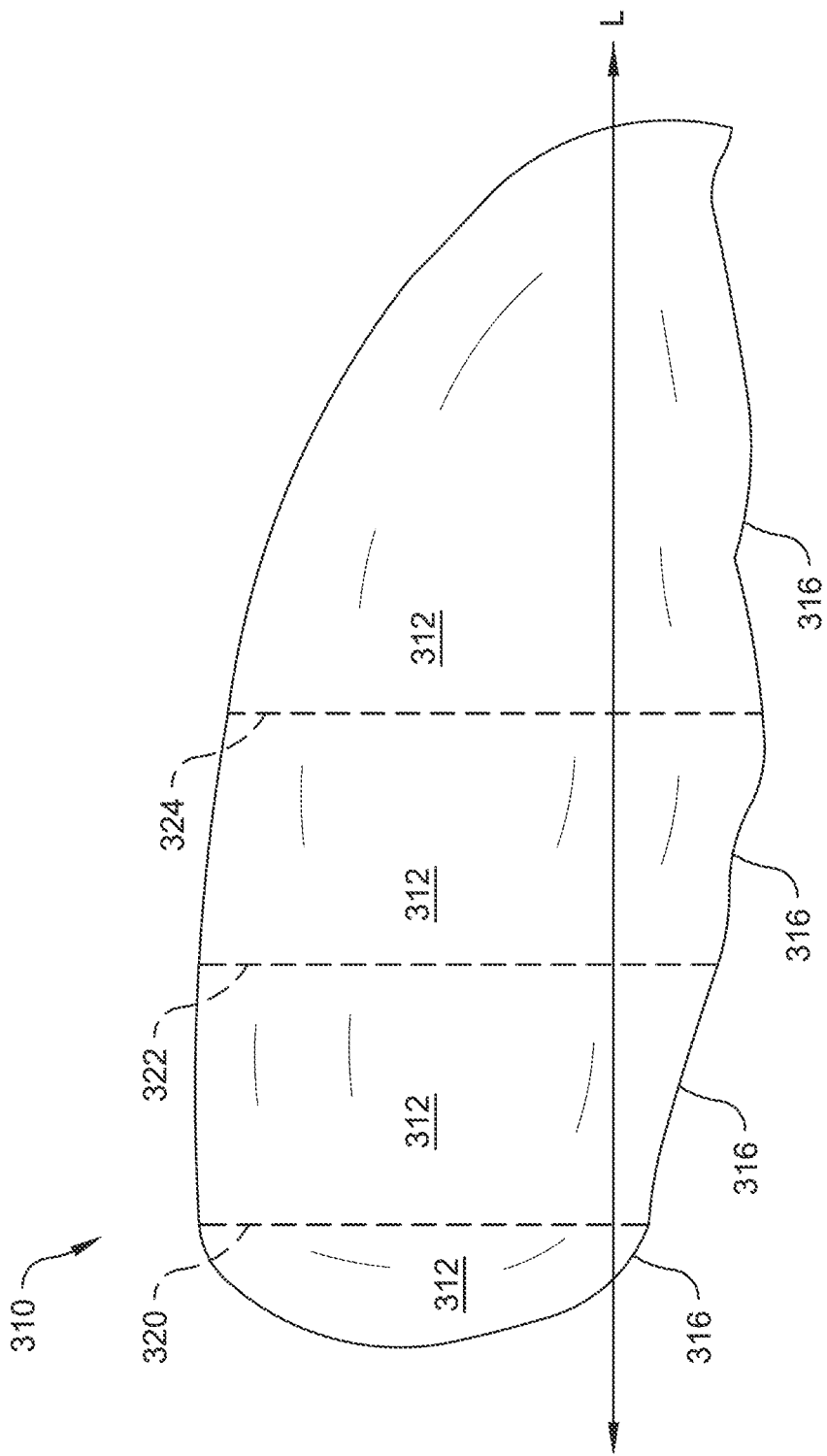
FIG. 8 is an upper front and top perspective view of a boneless, skinless half of a chicken breast, prior to processing into a first or second embodiment, according to the present disclosure.

FIG. 8 is an upper front perspective view of a boneless, skinless half chicken breast 310. Although the half chicken breast 310 is not an even or defined geometric shape, the half chicken breast 310 has a longitudinal orientation, which is an essentially lengthwise orientation, and a longitudinal axis L. The half chicken breast 310 comprises animal tissue, preferably animal muscle tissue having a grain oriented generally parallel or roughly parallel to the longitudinal axis L in a substantial portion of the half chicken breast 10. A smooth or generally smooth outwardly facing surface 312 of the half chicken breast 310 is oriented upwardly in FIGS. 8 through 11. As in the first embodiment, the outwardly facing surface 312 also extends onto the sides or edges of the half chicken breast 310. An opposite surface 314 of the chicken breast is oriented downwardly so that only the edge 316 thereof is visible in FIGS. 8 and 9. The opposite surface 314 appears as a line in FIGS. 10 and 11. The outwardly facing surface 312 is smooth in appearance relative to the opposite surface 314, and generally arises from the portion of the chicken breast that faces bones of a chicken carcass prior to removal of the bones. In FIG. 8, the dashed lines indicate a first cut line 320, a second cut line 322, and a third cut line 324, with each being generally across the grain and representing the location of a cut for preparing the half chicken breast 310 according to the second embodiment.

FIG. 9 is an upper front perspective view of the half chicken breast of FIG. 8, which has been divided into two transverse sectional pieces 350, 360 and an elongated end body 370 following a series of cuts along the cut lines 320, 322, and 324 of FIG. 8. The second embodiment of the method includes making the series of cuts along the cut lines 320, 322, and 324.

The cuts along the cut lines 320, 322, and 324 of FIG. 8 are spaced about 1.55 inches to 2 inches apart (for a typical large half chicken breast) along the cut lines 320, 322, 324 of FIG. 8. The cut line 324 of FIG. 8 may divide the half chicken breast 310 into the elongated end body 370 and a steak portion 371 of FIG. 9, from which the two transverse sectional pieces 350, 360 are or may be divided. The cuts result in the half chicken breast 310 being divided into a first trim piece 340, a first transverse sectional piece 350, a second transverse sectional piece 360, and an elongated end body 370. The first trim piece 340 may be used as mentioned above and is not required for assembling the food product according to the present disclosure. The first and second transverse sectional pieces 350, 360 respectively have first and second axially oriented surfaces 352, 362; pairs of first transversely oriented surfaces 354, 364; and first and second inward axially oriented surfaces 356, 366, which collectively are formed from the opposite surface 314. In one sequence of cuts, the elongated end body 370 may be cut from the half chicken breast 310 forming a steak portion 371, which comprises and may be cut into the first and second transverse sectional pieces 350, 360 and the trim piece 340 by cutting along the cut lines 320 and 322, as shown in FIG. 9.

Figures 10, 11:
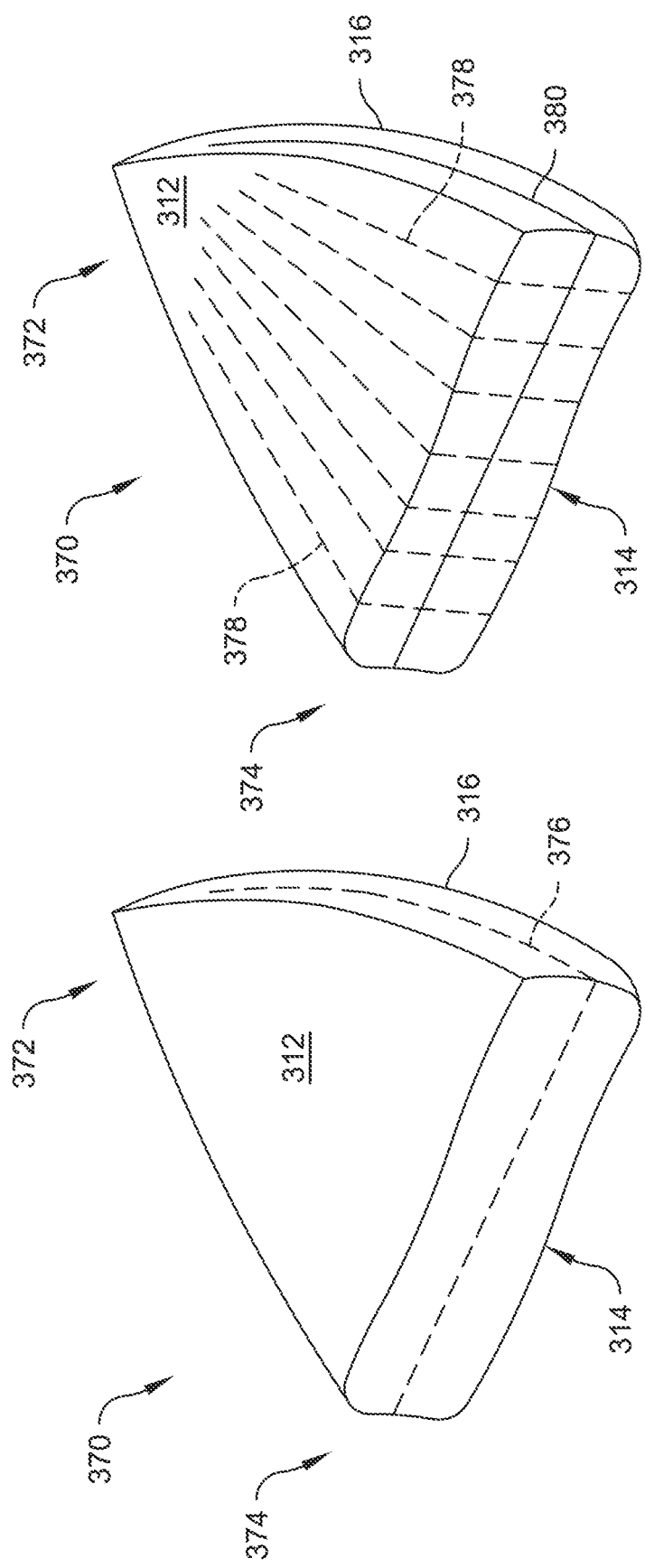
FIG. 10 is an upper left front and top perspective view of the elongated end body cut from the half chicken breast of FIG. 8, with cut lines shown as a dashed line and indicating a generally horizontal or butterfly cut, according to the second embodiment of the present disclosure.
FIG. 11 is an upper left front and top perspective view of the elongated end body cut from the half chicken breast of FIG. 8, after being cut horizontally along the cut lines shown in FIG. 10, with cut lines indicating vertical cuts to be made, according to the second embodiment of the present disclosure.

FIG. 10 is an upper left front perspective view of the elongated end body cut 370 from the half chicken breast 310 of FIG. 8. The elongated end body 370 has a first end 372 and a second end 374. A horizontal cut line or butterfly cut line 376 indicates the location of a generally horizontal cut or butterfly cut parallel to the longitudinal axis L and generally dividing the half chicken breast 310 so as to divide the thickness thereof. The cut line 376 does not extend entirely through the half chicken breast 310; instead, the cut line 376 terminates partially through the half chicken breast 310, so that upper and lower portions of the half chicken breast 310 remain attached to each other near the first end 372, which preferably is a narrower, generally triangular end of the half chicken breast 310.

FIG. 11 is an upper left front perspective view of the elongated end body 370 cut from the half chicken breast 310 of FIG. 8. The elongated end body 370 has been cut horizontally along the cut line 376 shown in FIG. 10. Here a plurality of generally vertical cut lines 378 indicate generally vertical cuts to be made approximately ¼ to ⅜ inches apart, preferably following the horizontal cut 380; the second embodiment of the method includes making such cuts.

Figure 12:
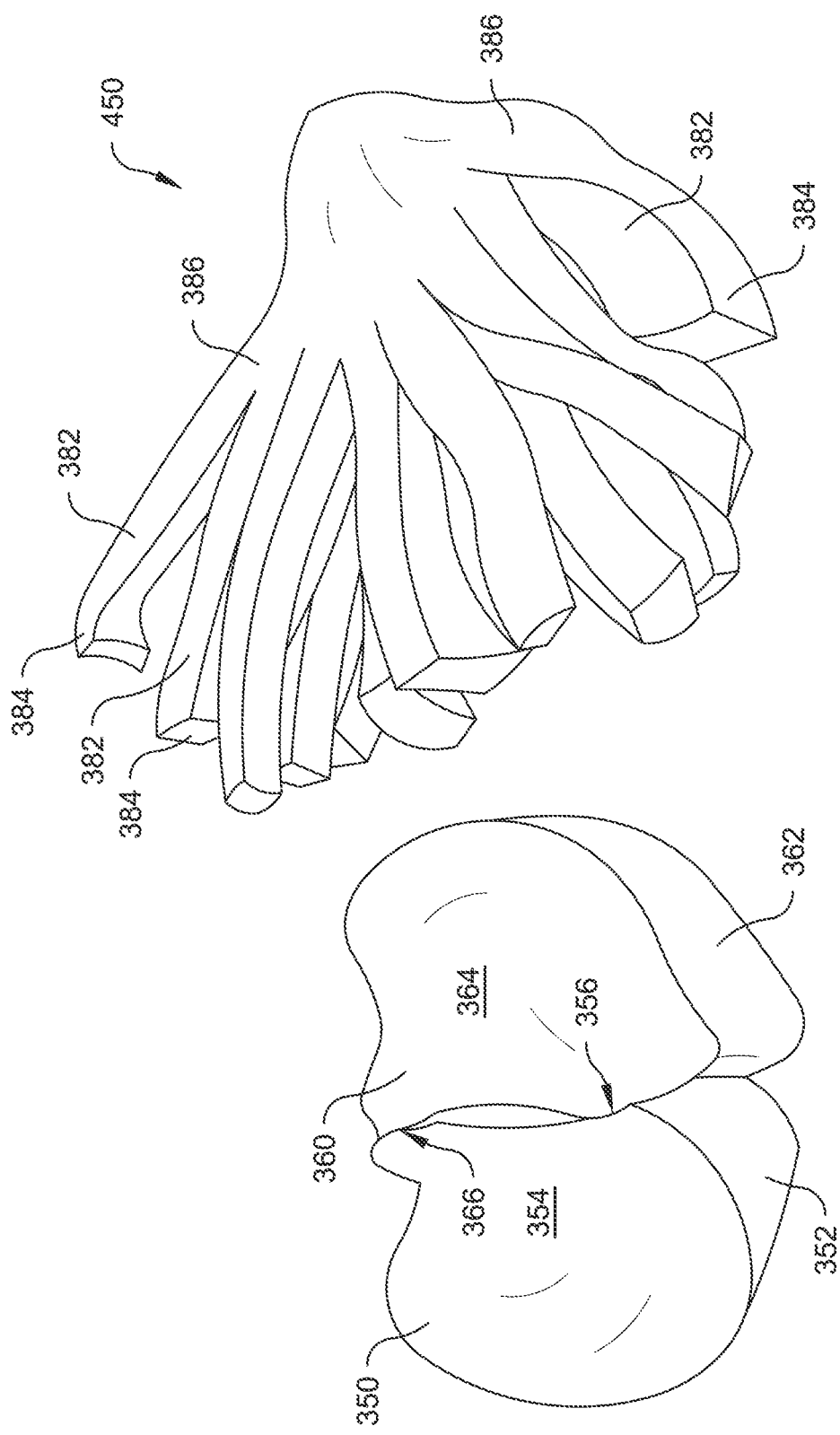
FIG. 12 is an upper front and top perspective view of the half chicken breast of FIG. 8, with the first and second transverse sectional pieces oriented as if laid on respective transversely oriented surfaces thereof and aligned to form a chicken-breast steak suitable for wrapping with a strip of bacon to form a bacon-wrapped chicken-breast steak, and with the elongated end body cut along the vertical cut lines shown in FIG. 11 into a plurality of strips that remain attached at a common end thereof, according to the second embodiment of the present disclosure.

FIG. 12 is an upper front perspective view of the half chicken breast 310 of FIG. 8, with the first and second transverse sectional pieces 350, 360 oriented as if laid on the respective transversely oriented surfaces thereof 354, 364 and aligned to form a chicken-breast steak 400 suitable for wrapping with a strip of bacon 120 to form a bacon-wrapped chicken-breast steak 430 (FIG. 13) similar to the first embodiment. The components of the bacon-wrapped chicken-breast steak 430 may optionally be secured by a skewer 150 as noted above. The bacon-wrapped chicken-breast steaks 430 are then complete and ready for packaging, further processing, or cooking. Methods according to the invention may include such wrapping or cooking steps.

The elongated end body may be cut 370 along the vertical cut lines 378 shown in FIG. 11 into a plurality of strips 382 that remain attached at the attached ends 386 to the first end 372 of the elongated end body 372. Free ends 384 of the strips 382 are disposed opposite the attached ends 386.

Figure 13:
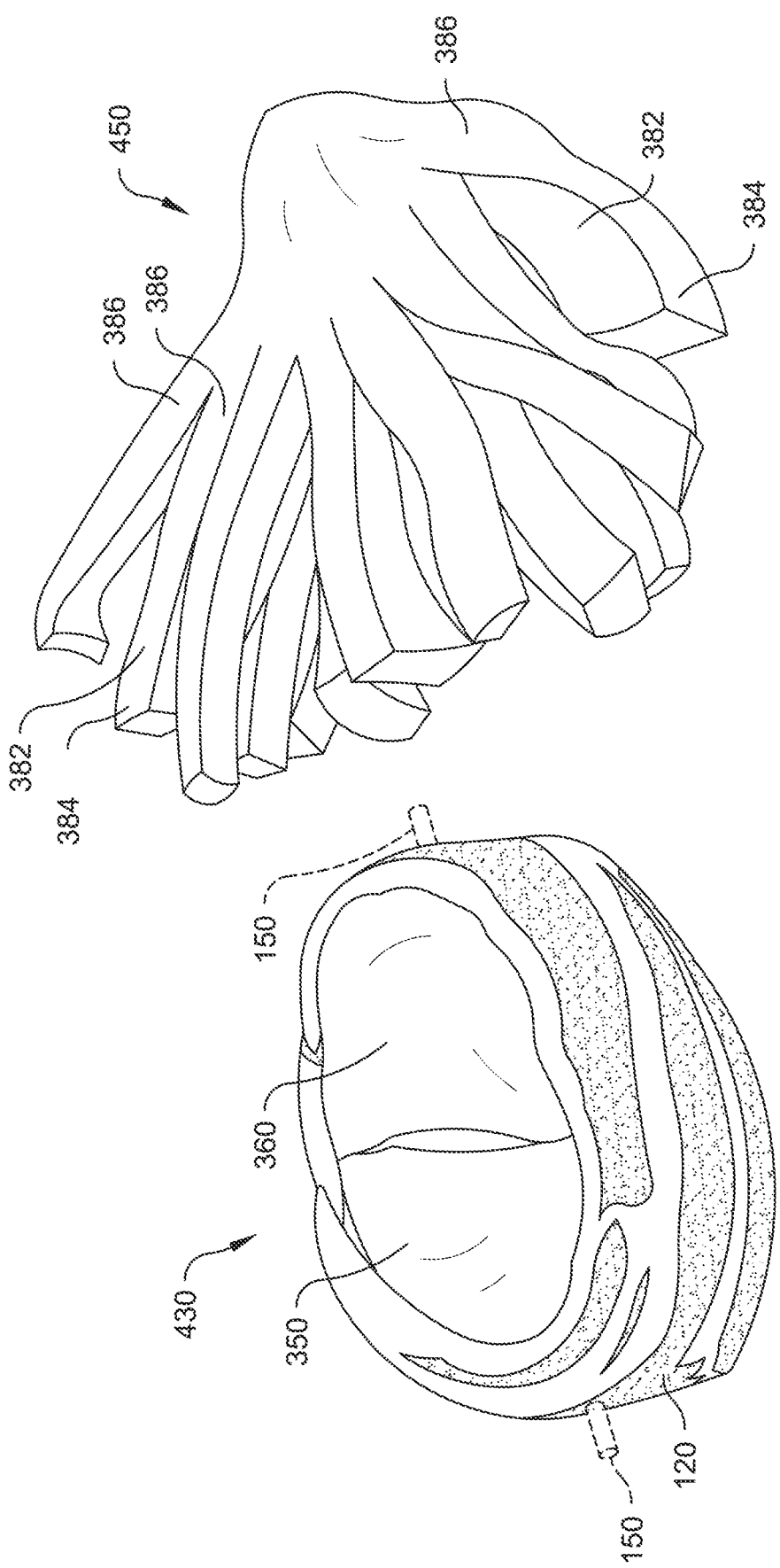
FIG. 13 is an upper front and top perspective view of the completed bacon-wrapped chicken-breast steak formed from the half chicken breast of FIG. 8, with the elongated end body after being cut along the vertical cut lines shown in FIG. 11 into a plurality of strips that remain attached at a common end thereof, according to the second embodiment of the present disclosure.

FIG. 13 is an upper front perspective view of the completed bacon-wrapped chicken-breast steak 430 formed from the half chicken breast 370 of FIG. 8, with the elongated end body 370 and a plurality of strips 382 attached thereto, formed as described above. The bacon-wrapped chicken-breast steaks 430 and the elongated body 370 with the attached strips 382 are complete and ready for packaging, further processing, or cooking.

A method according to the present disclosure may comprise preparing a bacon-wrapped chicken-breast steak 430 according to the second embodiment of the present disclosure, and an elongated body with attached strips 382, by following the steps described in the foregoing paragraphs. The method may further comprise the step of cooking the bacon-wrapped chicken steak 430 by any suitable technique, such as broiling, grilling, sautéing, or frying. The method may further comprise the step of cooking the elongated body 370 with the attached strips 382 by any suitable technique, preferably by a technique comprising battering and frying the elongated body 370 with the attached strips 382. The elongated body 370 with the attached strips 382 may be cooked and then served with the strips 382 still attached. The strips 382 may be detached by detaching the attached ends thereof from the first end 372 of the elongated body 370 for eating.

The food products according to the present disclosure may be formed, and the methods according to the present disclosure may be practiced, using animal tissue other than a chicken breast, such a breast of a turkey, duck, or other bird, or a section of mammal, fish, or other animal tissue with an elongated shape and/or a generally rectangular, oval, or oblong cross section. Animal tissue having any such a shape is particularly suitable for practicing the methods described herein, and for forming the products described herein, where the animal tissue has grains that run generally lengthwise with respect to all or a portion of the length of the portion of tissue. Animal tissue may or may not include a generally smooth outwardly facing surface and an opposite surface located opposite the outwardly facing surface as are found in a boneless, skinless half chicken breast. In such case the opposite surface may be chosen as any of the principal (largest) surfaces of a portion of animal issue, with the outwardly facing surface being defined as including all surfaces of the portion of animal tissue other than the opposite surface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure.

I claim:

1. A method for preparing a food product from a half chicken breast, the half chicken breast being boneless and skinless, having a longitudinal axis, and having a generally smooth outwardly facing surface and an opposite surface located opposite the outwardly facing surface, the method comprising the steps of:
   a) making a plurality of cuts along cut lines oriented transversely with respect to the longitudinal axis of the half chicken breast, the cut lines dividing the half chicken breast into first, second, third, and fourth transverse sectional pieces, with each transverse sectional piece having a respective outward axially oriented surface formed from the outer facing surface, a respective inward axially oriented surface formed opposite the respective outward axially oriented surface, and respective first and second transversely oriented surfaces oriented transversely with respect to the longitudinal axis;
   b) aligning the respective inward axially oriented surfaces of the first and fourth transverse sectional pieces in facing engagement to form a first chicken-breast steak wherein the outward axially oriented surfaces form an axially oriented perimeter surface; and
   c) aligning the respective inward axially oriented surfaces of the second and third transverse sectional pieces in facing engagement to form a second chicken-breast steak wherein the outward axially oriented surfaces form an axially oriented perimeter surface.

2. The method according to claim 1, further comprising the steps of:
   d) wrapping a first strip of bacon around the axially oriented perimeter surface of the first chicken-breast steak; and
   e) wrapping a second strip of bacon around the axially oriented perimeter surface of the second chicken-breast steak.

3. The method according to claim 1, wherein with the first, second, third, and fourth transverse sectional pieces are cut from sequentially adjacent portions of the half chicken breast.

4. The method according to claim 3, further comprising the steps of:
   f) pushing a first skewer through the first and fourth transverse sectional pieces to secure the first chicken-breast steak; and
   g) pushing a second skewer through the second and third transverse sectional pieces to secure the second chicken-breast steak.

5. The method according to claim 1, further comprising the steps of:
f) pushing a first skewer through the first chicken-breast steak to secure the first chicken-breast steak; and
h) pushing a second skewer through the second chicken-breast steak to secure the second chicken-breast steak.

6. The method according to claim 2, further comprising the step of:
f) cooking the first chicken-breast steak following the wrapping thereof.

7. The method according to claim 1, wherein step (a) further comprises:
making an additional cut along an additional cut line oriented transversely with respect to the longitudinal axis of the half chicken breast, the additional cut line dividing a trim piece from the first transverse sectional piece.

8. The method according to claim 7, wherein step (a) further comprises:
making a second additional cut along a second additional cut line oriented transversely with respect to the longitudinal axis of the half chicken breast, the additional cut line dividing a second trim piece from the first transverse sectional piece.

9. A method for preparing food products from a plurality of half chicken breasts, each half chicken breast being boneless and skinless, having a longitudinal axis, and having a generally smooth outwardly facing surface and an opposite surface located opposite the outwardly facing surface, the method comprising the steps of:
a) processing each half chicken breast of the plurality of chicken breasts by making a plurality of cuts along cut lines oriented transversely with respect to the longitudinal axis of the half chicken breast, the cut lines dividing the half chicken breast into at least first and second transverse sectional pieces, with each transverse sectional piece having a respective outward axially oriented surface formed from the outer facing surface, a respective inward axially oriented surface formed opposite the respective outward axially oriented surface, and respective first and second axially transverse oriented surfaces; and
b) aligning respective inward axially oriented surfaces of first and second transverse sectional pieces in facing engagement to form a first chicken-breast wherein the outward axially oriented surfaces form an axially oriented perimeter surface.

10. The method according to claim 9, further comprising the steps of:
c) wrapping a first strip of bacon around the axially oriented perimeter surface of the first chicken-breast steak.

11. The method according to claim 10, further comprising the steps of:
d) pushing a first skewer through the first and second transverse sectional pieces to secure the first chicken-breast steak.

12. The method according to claim 11, further comprising the step of:
e) cooking the first chicken-breast steak following the wrapping thereof.

13. The method according to claim 12, wherein step (a) further comprises:
making an additional cut along an additional cut line oriented transversely with respect to the longitudinal axis of the half chicken breast, the additional cut line dividing a trim piece from the first transverse sectional piece.

14. The method according to claim 13, wherein step (a) further comprises:
making a second additional cut along a second additional cut line oriented transversely with respect to the longitudinal axis of the half chicken breast, the additional cut line dividing a second trim piece from the first transverse sectional piece.

* * * * *